United States Patent
Staub et al.

(10) Patent No.: US 8,052,171 B2
(45) Date of Patent: Nov. 8, 2011

(54) SECURITY ELEMENT FOR RF IDENTIFICATION

(75) Inventors: René Staub, Hagendorn (CH); Wayne Robert Tompkin, Baden (CH); Andreas Schilling, Hagendorn (ZG) (CH); Olaf Krolzig, Beinwill am See (AG) (CH); John Anthony Peters, Au (CH)

(73) Assignee: OVD Kinegram AG, Zug (CH)

( * ) Notice: Subject to any disclaimer, the term of this patent is extended or adjusted under 35 U.S.C. 154(b) by 1162 days.

(21) Appl. No.: 11/571,465

(22) PCT Filed: Jun. 16, 2005

(86) PCT No.: PCT/EP2005/006453
§ 371 (c)(1),
(2), (4) Date: Apr. 3, 2007

(87) PCT Pub. No.: WO2006/002770
PCT Pub. Date: Jan. 12, 2006

(65) Prior Publication Data
US 2007/0229263 A1   Oct. 4, 2007

(30) Foreign Application Priority Data
Jun. 30, 2004   (DE) .......................... 10 2004 031 879

(51) Int. Cl.
*B42D 15/00* (2006.01)
*G08B 13/14* (2006.01)

(52) U.S. Cl. .............. 283/83; 283/91; 283/94; 283/111; 340/572.1; 340/572.8

(58) Field of Classification Search .................... 283/57, 283/72, 74–75, 83, 85–86, 91, 94, 111; 235/491–492, 487–488, 382–385; 340/568.1, 340/572.1, 572.8; 359/1–3
See application file for complete search history.

(56) References Cited

U.S. PATENT DOCUMENTS
4,220,956 A   9/1980   Sanford
(Continued)

FOREIGN PATENT DOCUMENTS
DE   3932505   4/1991
(Continued)

OTHER PUBLICATIONS
Russian Office Action issued Dec. 19, 2009 from pending Russian Patent Appln. No. 2007103337 filed Jun. 16, 2005.
(Continued)

*Primary Examiner* — Dana Ross
*Assistant Examiner* — Kyle Grabowski
(74) *Attorney, Agent, or Firm* — Hoffmann & Baron, LLP (57) ABSTRACT

The invention concerns a security element (10) for RF identification, and a security document which is provided with such a security element (10). The security element has a flexible film body (104) into which are integrated an electronic circuit which is designed for the storage of security-relevant items of information and an RF antenna which is connected to the electronic circuit and which serves for contact-less communication of the electronic circuit with a test device. Permanently fixed on a surface of the flexible film body (104) is a first optically variable element (102) which at least region-wise covers the region of the flexible film body in which the electronic circuit is arranged, wherein permanently fixed on the other opposite surface of the flexible film body is a second optically variable element.

26 Claims, 6 Drawing Sheets

U.S. PATENT DOCUMENTS

| | | | |
|---|---|---|---|
| 5,528,222 | A | 6/1996 | Moskowitz et al. |
| 6,098,889 | A * | 8/2000 | Ogawa et al. ............... 235/492 |
| 6,170,880 | B1 | 1/2001 | Prancz |
| 6,747,768 | B1 * | 6/2004 | Knocke et al. ............... 359/2 |
| 7,021,550 | B2 * | 4/2006 | Uchihiro et al. ............ 235/492 |
| 7,284,270 | B2 | 10/2007 | Kitamura et al. |
| 7,374,098 | B2 * | 5/2008 | Salib et al. ............... 235/492 |
| 7,463,154 | B2 | 12/2008 | Cortina et al. |
| 2003/0038174 | A1 | 2/2003 | Jones |
| 2003/0067389 | A1 | 4/2003 | Look |
| 2003/0164611 | A1 | 9/2003 | Schneider et al. |
| 2003/0179150 | A1 | 9/2003 | Adair et al. |
| 2003/0234294 | A1 * | 12/2003 | Uchihiro et al. ............ 235/492 |
| 2004/0041032 | A1 | 3/2004 | Schmuck et al. |
| 2004/0118930 | A1 * | 6/2004 | Berardi et al. ............. 235/492 |
| 2004/0218273 | A1 * | 11/2004 | Mimura .................... 359/530 |
| 2005/0040243 | A1 * | 2/2005 | Bi et al. .................... 235/492 |
| 2006/0226238 | A1 * | 10/2006 | Salib et al. ............... 235/492 |
| 2007/0194133 | A1 * | 8/2007 | Mimura .................... 235/492 |
| 2007/0246931 | A1 * | 10/2007 | Hansen et al. ............... 283/83 |
| 2008/0259416 | A1 * | 10/2008 | Peters et al. ............... 359/2 |

FOREIGN PATENT DOCUMENTS

| | | |
|---|---|---|
| DE | 10032128 A1 | 1/2002 |
| DE | 10232568 A1 | 1/2004 |
| EP | 1179811 A1 | 2/2002 |
| EP | 1411465 A1 | 4/2004 |
| JP | H06-055753 | 8/1994 |
| JP | 8262963 | 10/1996 |
| JP | 8282678 | 10/1996 |
| JP | 1134847 | 12/1999 |
| JP | 2003-085525 | 3/2003 |
| JP | 2005513585 | 5/2005 |
| RU | 2176190 | 11/2001 |
| WO | WO 97/19818 | 6/1997 |
| WO | WO 02/089338 | 11/2002 |
| WO | WO2004008397 A1 | 1/2004 |

OTHER PUBLICATIONS

Examination Report issued Oct. 27, 2008 by the German Patent and Trademark Office for German Patent Application No. 10 2004 031 879.4-45 (related to the subject application by priority, see p. 2 top of page).

Russian Office Action from Russian Patent Application No. 2007103337/04.

Japanese Office Action dated Sep. 14, 2010 issued in Japanese Patent Application No. 2007-518486.

* cited by examiner

SECURITY ELEMENT FOR RF IDENTIFICATION

This application claims priority based on an International Application filed under the Patent Cooperation Treaty Application No. PCT/EP2005/006453, filed on Jun. 16, 2005 and German Application No. 102004031879.4-45, filed on Jun. 30, 2004, which are both incorporated herein by reference.

BACKGROUND OF THE INVENTION

The invention concerns a security element for RF identification and a security document, in particular a passport having such a security element.

U.S. Pat. No. 4,220,956 describes an RF identification circuit (RF=radio frequency) which has an array of antennae which are produced by means of an etching process from a copper laminate. The copper laminate is applied to a dielectric. As the dielectric does not afford any electrical functions, it can be of a very thin configuration whereby the mechanical to flexibility of the RF identification circuit is increased.

U.S. Pat. No. 5,528,222 describes an RF identification circuit which reflects an RF carrier sent by a base station back to the base station and in so doing modulates on to the reflected signal additional information in accordance with a pre-programmed information protocol. The RF identification circuit has a semiconductor circuit with a memory and one or more RF components of an RF circuit. The semiconductor circuit is mounted on a substrate. The RF signal received by the antenna is forwarded to the semiconductor circuit. The substrate is a flexible, non-conducting substrate. The antenna is an integral component part of the substrate. It comprises a track with is between 25 and 35µm thick and which is applied to a polyester or polyamide layer.

By virtue of that structure the RF identification circuit is of a very thin and mechanically flexible form.

SUMMARY OF THE INVENTION

The object of the invention is now that of improving RF identification.

That object is attained by a security element for RF identification, which has a flexible film body into which are integrated an electronic circuit which is designed for the storage of security-relevant items of information and an RF antenna which is connected to the electronic circuit and which serves for contact-less communication of the electronic circuit with a test device, and in which permanently fixed on a surface of the flexible film body is a first optically variable element which at least region-wise covers the region of the flexible film body in which the electronic circuit is arranged, wherein permanently fixed on the other surface of the flexible film body opposite said surface is a second optically variable element. Thus the electronic circuit is optimally protected from invasive intrusions.

That object is further attained by a security document having such a security element.

The invention provides that the security-relevant items of information which are stored by the electronic circuit of the security element are reliably protected from manipulation and spying. An 'attack' on the data stored in the electronic circuit by means of imaging of the circuit and reverse engineering, for example using commercially available to methods such as 'microproving' inevitably result in destruction of an optically variable element and can be easily recognised. That additional protection in respect of the authenticity of the security-relevant information which is managed by an RF identification circuit, in comparison with the methods usually employed for that purpose such as (asynchronous) encryption technologies or electronic security certificates, achieves a considerable improvement in the security of an RF identification method as two very different technologies are combined to protect the authenticity of the data and thus an 'attack' on the authenticity of the data is made very much more difficult.

Further advantages of the invention are to be found in the appendant claims.

In accordance with a preferred embodiment of the invention the flexible film body is of a transparent nature in the region surrounding the electronic circuit. Manipulation operations on the electronic circuit can in that way be particularly easily recognised. In addition it is possible in that way that the viewing person has a viewing impression which is influenced both by the film body containing the electronic circuit and also by the first and/or second optically variable element. Integration of the viewing impression of the flexible film body into the optical effect generated by the first and/or second optically variable element is thus possible, whereby manipulation operations become particularly easily recognisable.

There are a large number of possible ways of improving the security of the data stored in the electronic circuit by additional measures:

Thus it is possible for the optical effects generated by the first optically variable element and the second optically variable element to exhibit mutually supplementary representations so that the omission of or a change to one of the two optically variable elements becomes immediately obvious to the viewer.

Preferably the first and second optically variable elements overlap at least in region-wise manner. Thus for example a transmissive region of the first optically variable element and a reflective region of the second optically variable element can overlap, for example in the manner of a mosaic, so that the omission of one of the two security elements or a change to the register relationship or the position and orientation of one of the optically variable security elements becomes immediately recognisable.

In accordance with a further preferred embodiment of the invention the first and second optically variable elements are matched to each other in such a way that, upon superimposition of the first and second optically variable elements, a further, concealed optical effect becomes visible. Thus for example the second optically variable element has a moiré pattern and the first optically variable element has a corresponding moiré analyser so that, upon superimposed viewing of the first and second optically variable elements, a moiré image which is hidden in the moiré pattern becomes visible. By virtue of a suitable choice of the raster used for the moire analyser and the moiré pattern, even small register relationship inaccuracies between the first and second optically variable elements can decide whether the moiré pattern is rendered visible, whereby the level of security of the data is further improved.

In addition it is also possible to achieve concealed optical effects by the use of a transmissive lens raster for the first optically variable element and a reflective diffractive structure or an overprint for the second optically variable element. By virtue of the superimposition of such structures, it is possible to render visible concealed items of information which are encoded in the deviation of structure elements of the first and second optically variable elements. Further obvious optical effects which are shown only upon superimposed viewing of the first and second optically variable elements can be generated by a transmissive lens raster being used as the first optically variable element and a reflective lens raster or a raster comprising concave mirror elements being used as the second optically variable element. The optical effects generated in that way can be imitated by other technologies only with very great difficulty.

A further preferred option provides that a transmissive lens raster is used as the first optically variable element and a transmissive lens raster is also used as the second optically variable element. In this case also for example the representation of an item of information arranged beneath the security element depends on register-accurate arrangement of precisely those specific optically variable elements so that this also makes it possible to achieve a particularly high degree of data security.

In accordance with a preferred embodiment of the invention the RF antenna is arranged outside the region in which the first or the second optically variable element respectively is provided. The RF antenna and the first or the second optically variable element do not overlap as a result. In that way it is possible for the first and/or the second optically variable element to be provided with a metallic reflection layer which otherwise would result in the characteristics of the RF antenna being impaired.

The optically variable elements which are permanently fixed on the flexible film body are preferably of a thickness of between about 5 and 15 μm so that detachment of those layers from the flexible film body which is preferably of a thickness of between 100 and 400 μm is not possible without destroying the optically variable elements. In that case the optically variable elements are preferably applied to the flexible film body by means of a transfer film, for example a hot stamping film. In that case permanent fixing of the optically variable elements is achieved for example by a laminating process or by an adhesive which can be hardened or cross-linked by heat, pressure or radiation.

In accordance with a further preferred embodiment of the invention the electronic circuit adjoins the surface of the flexible film body and is in direct permanent adhesion relationship with the first optically variable element.

In that respect security elements according to the invention are preferably introduced into identification documents, for example passports. In that respect it is essential that the first and/or second optically variable element remains visible to the viewer and can thus still be checked, even after the security element has been introduced into the security document, Preferably in that case the security element is introduced into a security document which has one or more pages, preferably of paper, which are joined together by adhesive, binding or stapling, The security element is applied on the rear side of the security document. A transparent inspection window is introduced into the page which is in front thereof of the security document in accurate register relationship with the first optically variable element so that optical inspection of the authenticity of the data is possible. In addition the security element can be introduced between two pages of the security document and can be joined thereto for example by adhesive, in which case also the one and/or the other of those two pages has a transparent inspection window which is oriented in precise register relationship with the first or second optically variable element respectively.

In accordance with a preferred embodiment of the invention the security document in that case has one or more pages which have an electrically conductive layer arranged in the region of the RF antenna of the security element. That electrically conductive layer provides for electromagnetic screening of the RF antenna so that a communication between the electronic circuit and a test device by way of the RF antenna is possible only when the security document is opened. That provides that the level of security of the security-relevant data stored in the electronic circuit is further enhanced. When the document is closed, no access to the data stored in the electronic circuit is also possible by way of the radio interface. Furthermore unwanted interferences between various identification systems are also prevented in that way.

The page of the security document which acts as a 'screening film' preferably comprises an optically variable element provided with a metallic reflection layer. It is however also possible for the electrically conductive layer to be introduced between two adjacent pages of the security document and thus concealed from the viewer.

Preferably in that case the electromagnetic 'screening film' is provided with an optically variable element which forms a supplementary representation with the first and/or second optically variable elements which are permanently fixed on the flexible film body containing the electronic circuit and the RF antenna. In that case the supplementary representation at least region-wise covers over the region of the electronic circuit so that it is further possible by virtue thereof to investigate whether the first and/or second optically variable element has been removed or damaged in the region of the electronic circuit.

In accordance with a further preferred embodiment the region of the carrier layer of the security document, to which the first security element according to the invention is applied, has individualised information which is covered over by the first and/or second optically variable element of the security element when the security element is applied. By virtue thereof it is additionally possible for the security-relevant items of information stored in the electronic circuit to be additionally protected by the individualised information, for example the picture of the passport holder.

The invention is described by way of example hereinafter by means of a number of embodiments with reference to the accompanying drawings in which:

BRIEF DESCRIPITION OF THE DRAWINGS

FIG. 1b shows a sectional view of the security element of FIG. 1a,

FIGS. 5a through 7b show diagrammatic views to illustrate the structure of security elements according to the invention in accordance with further embodiments of the invention.

DETAILED DESCRIPITION OF THE INVENTION

Figure 1A:
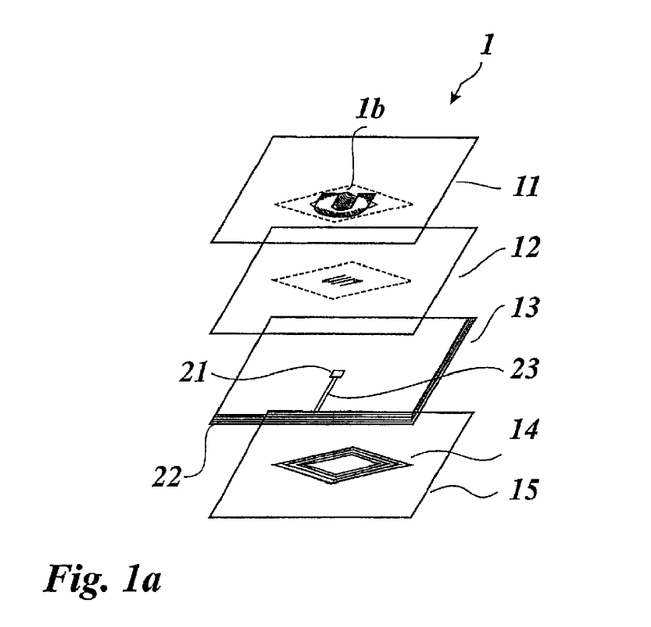
FIG. 1a shows a diagrammatic representation for illustrating the structure of a security element according to the invention for RF identification.
Figure 1B:
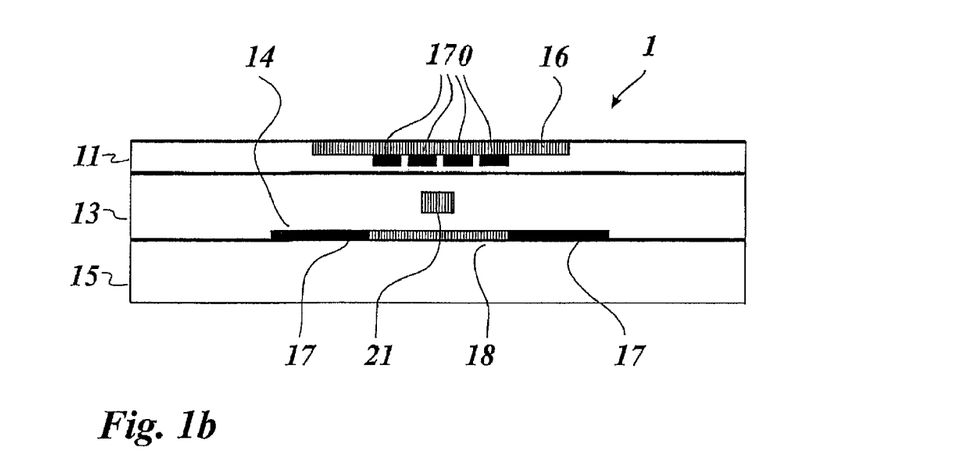

FIG. 1a and FIG. 1b show a multi-layer security element 1 for RF identification, comprising a plurality of layers 11, 13, 14 and 15 which are permanently connected together. In that respect various methods, for example adhesive, cold lamination, hot lamination, hot stamping or glueing by means of UV-hardenable adhesive can be used for permanently connecting those layers.

The layer 13 is a thin flexible film body of a layer thickness of between about 100 μm and 400 μm. That film body comprises a transparent polyester carrier which has an electronic circuit 21, an RF antenna 22 and a waveguide 23 for connecting the RF antenna 22 to the electronic circuit 21.

The electronic circuit 21 preferably comprises an integrated circuit which is produced using silicon technology and which is applied to a very thin silicon carrier. That circuit preferably comprises a microprocessor with associated memory as well as peripheral driver components which permit communication of that microprocessor by way of the radio interface served by means of the RF antenna. In that case the power supply for the microprocessor is also implemented by way of the RF antenna 22 which feeds the microprocessor with the electromagnetic radiation energy induced in the antenna.

The microprocessor has a protected storage region in which security-relevant data, for example biometric information about a passport holder (identification data or authorisation data or secret key) are stored. Those data are preferably used to securely identify the person carrying the security element, in relation to the test device, upon communication in respect of the microprocessor.

Furthermore it is also possible for the electronic circuit 21 not to be based on conventional silicon technology but for the circuit to involve an organic semiconductor circuit.

The shape and configuration of the antenna 22 is essentially determined by the carrier frequency of the identification method for which the security element 1 is used. In this case the antenna preferably comprises a plurality of conductor tracks of an electrically conductive material, which are arranged in the form of a loop. In this case the RF antenna can comprise a thin wire which is cast or laminated into the layer 13, a conductive paste which is applied to a carrier substrate in the desired antenna shape, or a thin layer of a conductive material, which layer is structured in accordance with the desired antenna structure by positive/negative etching (shadow mask), corresponding printing thereon or ablation, for example laser ablation. In that respect it is also possible for the antenna 22 to comprise a transparent conductive material, for example indium-tin oxide, polyaniline and/or conductive polymers, The layers 11, 12 and 14 are each of a thickness of between about 10 and 50 μm.

The layer 11 comprises the transfer layer of a stamping film which has a protective lacquer layer, a replication lacquer layer with diffractively optically active relief structure which is shaped therein, a partial reflection layer and an adhesive layer.

The protective lacquer layer is preferably of a thickness of between 1 and 2 μm. The replication lacquer layer preferably comprises a thermoplastic or cross-linked polymer in which a diffractive relief structure which acts for example as a hologram or a Kinegram® is shaped by means of a replication tool under the effect of heat and pressure in the region of an optically variable element 16, For that purpose for example a thermoplastic replication lacquer is applied to the lacquer layer over the full area by means of an intaglio printing screen roller, dried and then the diffractive structure is embossed in the above-identification regions by means of an embossing die. In addition it is also possible for a radiation-cross-linkable lacquer to be applied to the protective lacquer layer, as the replication lacquer, and for the diffractive structure then to be shaped into the replication lacquer layer by means of UV-replication.

The (structured) reflection layer is then applied to the replication lacquer layer. For that purpose the reflection layer which is preferably a reflective metal layer, for example of copper, silver, aluminum or gold is applied to the replication lacquer layer over the full surface area and then removed again in region-wise manner by means of positive-negative etching or by means of ablation so as to afford the desired structured reflection layer. Thus a metallisation which is possibly finely structured remains for example in the region shown in FIG. 1a whereas the layer 11 is transparent in the remaining region.

In addition it is also possible for only an optical separation layer which enhances reflection to be applied (partially) to the replication lacquer layer, instead of an opaque reflection layer. An optical separation layer of that kind preferably involves an HRI or LRI layer (HRI=high refraction index and LRI=low refraction index) which for example comprises a thin vapor-deposited layer of a dielectric or a thin and thus transmissive metal layer.

It is further possible for a reflective or transmissive thin film layer system to be applied to the replication lacquer layer, which system produces for example color shifts by means of interference or enhances reflection so that the optically variable element 16 exhibits (partially) a transmissive element having an optical-diffraction effect. Thus for example a thin film layer system comprising $ZnS/MgF/ZnS$ or $TiO_2/SiO_2/TiO_2$ can be applied to the replication lacquer layer. It is also possible to use thin film layer systems comprising very thin metal layers, for example $Al/MgF/Al$.

In the embodiment shown in FIG. 1a the transfer layer of the transfer film is further provided with a partial imprint 170 thereon in the regions shown in FIG. 1b, prior to application to the film body 13, The print 170 in that case is preferably implemented in the region of the transfer layer, in which the transfer layer is transparent or partially transparent as no opaque reflection layer is provided there. In that case the print 170 preferably includes an effect pigment, for example an interference layer pigment or a cholesteric liquid crystal pigment.

As an alternative to the layer 11 the layer 12 can also be applied to the film body 13. The layer 12 is made up like the layer 11, with the difference that the layer 12 is completely transparent and comprises the replication lacquer layer with impressed diffractive structure of the layer 11 and a transparent optical separation layer (as described hereinbefore) so that the print 170 can be clearly seen.

As shown in FIG. 1a the layer 11 or the layer 12 is applied to the film body 13 in such a way that the optically variable element contained in that layer, for example the optically variable element 16, at least region-wise covers over the region of the film body 13 in which the electronic circuit 21 is arranged.

The layer 14 is like the layer 11, in which respect in a region 17 it has a reflective optically variable effect while in a region 18 it has a transmissive optically variable effect. The layer 14 thus comprises a transfer layer of a transfer film which is applied in the shape shown in Figure la to the carrier layer 15, for example by means of a hot stamping method. Here the carrier layer 15 comprises for example a PET, PVC, ABS or PC film of a thickness of 12μm. After the layer 14 has been applied to the carrier layer 15 the film body formed by the layers 14 and 15 is permanently connected to the film body 13 by one of the above-identified methods in the register relationships shown in Figures 1a and 1b with respect to the layer 11 and the electronic circuit 21.

Accordingly in the case of the security element 1 both the optical effects generated by the optically variable element 16 and also those generated by the optically variable element afforded by the layer 14 as well as the electronic circuit 21 are recognisable by the viewer so that the authenticity of the electronic circuit can be easily checked.

Figure 2A:
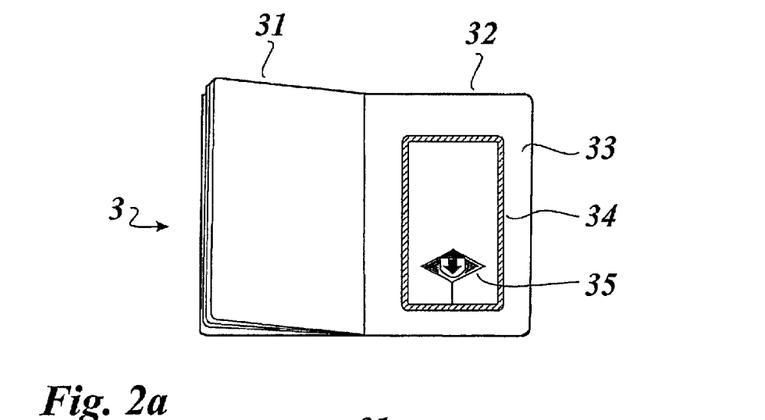
FIG. 2a through FIG. 2c show views of a security document according to the invention.
Figure 2B:
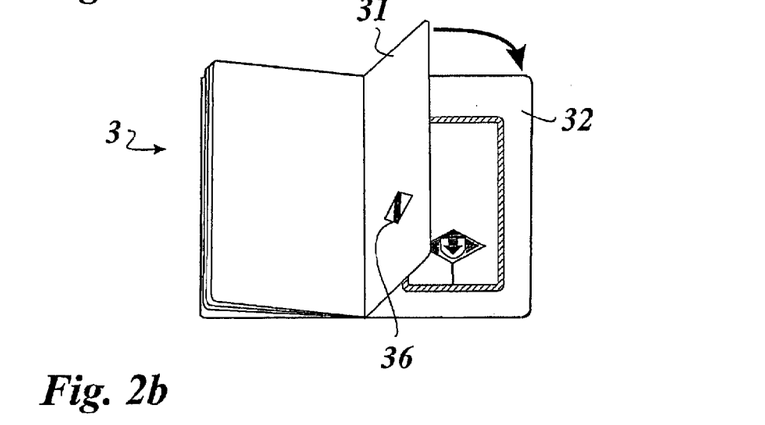

Introduction of a security element 33 produced in accordance with FIGS. 1a and 1b into a security document 3 will now be illustrated with reference to FIGS. 2a through 2c.

As indicated hereinbefore the security element 33 comprises a multi-layer transparent flexible firm body which, in the region of the electronic circuit, has an optically variable element 35 as welt as the (opaque) conductor tracks of an antenna 34. The security document 3 has a plurality of pages which are joined together by means of adhesive, stapling or binding. The security element 33 is now applied to the last page of the security document 3, the page 32, and permanently connected thereto by one of the above-described methods.

Then in a next step (FIG. 2b) a transparent inspection window is formed in the adjacent page 31 of the document 3, for example by a cutting or stamping operation.

Figure 2C:
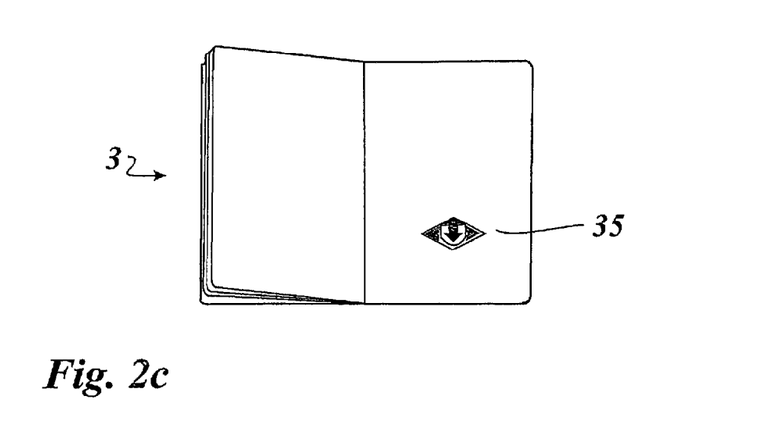

The page 31 is then permanently joined to the security element 32 by one of the above-described methods so that only the optically variable element 35 still remains visible for a viewer, through the inspection window 36 (FIG. 2c).

In that way the optically variable element and the part containing the electronic circuit of the security element remains visible to the viewer so that the viewer can check the authenticity of the data stored in the electronic circuit whereas the remaining antenna structure is concealed and is thus invisible for the viewer.

Preferably in that arrangement the security document 3 also has one or more pages which have a thin electrically conductive layer arranged at least in the region of the antenna 34. Thus FIG. 3 shows a page 37 of the security document 3 which has such a metallised film which screens the antenna of the security element 33 as described above so that communication with the electronics of the security element 33 by way of the radio interface afforded by the antenna is possible only when the security document 3 is opened.

Figure 3:
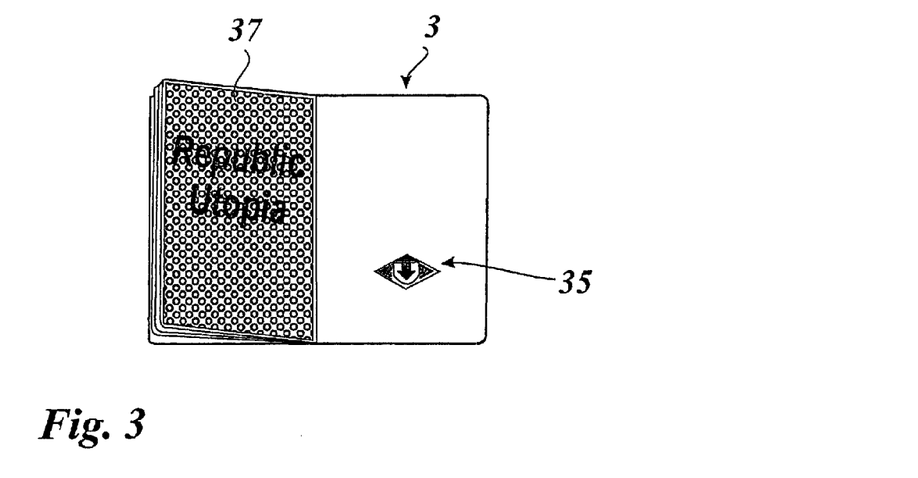
FIG. 3 shows a view of a security document according to the invention for a further embodiment of the invention.

In this respect the page 37 can comprise a partial metallised film which is shown in FIG. 3 and which in addition can also have one or more optically variable elements, for example a hologram or a Kinegram®.

Figure 4:
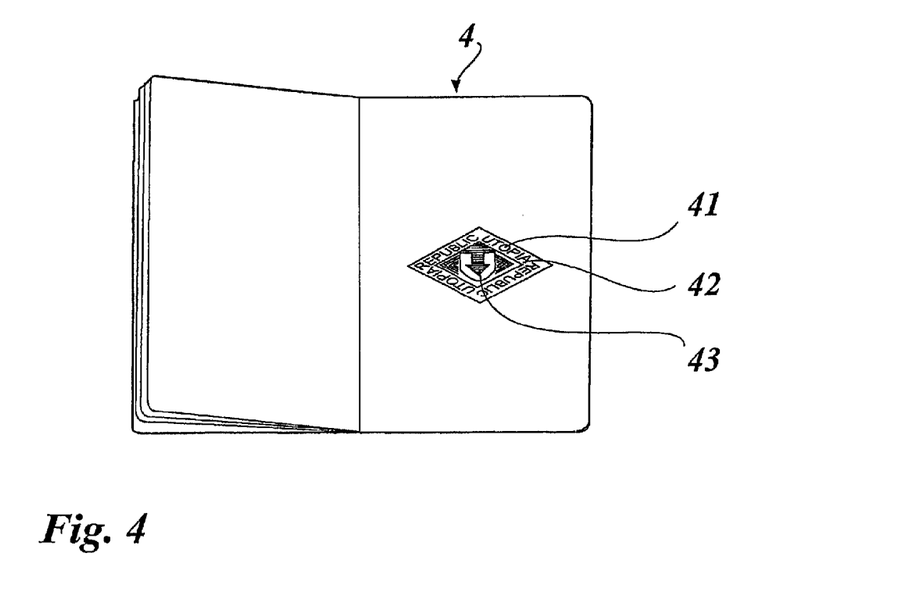
FIG. 4 shows a view of a security document according to the invention for a further embodiment of the invention.

FIG. 4 shows a security document 4 in which the security element is introduced between two pages of the security document 4 and glued thereto and, as already described above, only a part of the security element remains visible through an inspection window.

In a central region 43 an optically variable element covers the region of the electronic circuit. In a peripheral region 42 in which the antenna is arranged, there is a further optically variable element 41 comprising a security print and a diffractive film which covers over the region.

Figure 5A:
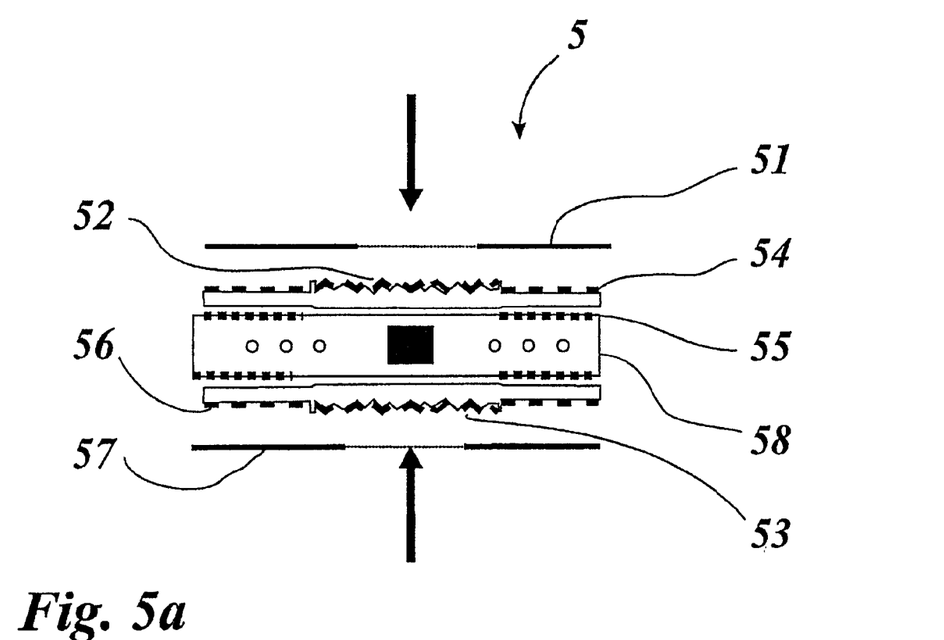

FIG. 5a shows a diagrammatic representation of a security element 5 which is introduced between two pages 51 and 57. As shown in FIG. 5a that security element can be viewed through two oppositely disposed inspection windows and thus inspected from both sides.

The transparent and flexible film body 58 into which the electronic circuit and the RF antenna are integrated as indicated in FIG. 5a is provided on both sides in the region of the RF antenna with a security print 55 thereon. Applied to the one surface of the film body 58 is a transfer layer of a transfer film which in the region of the electronic circuit shows a partially transmissive optically variable element 52 which has an optical-diffraction effect. The transfer layer is then overprinted with a security print 54 in the region surrounding that optically variable element.

In a similar manner, a transfer layer of a transfer film is applied to the rear side and then overprinted so that there the arrangement has a partially transmissive optically variable element 53 and a security print 56 thereon surrounding same. Preferably transmissive regions of the optically variable element 52 and of the optically variable element 53 are in mutually superposed relationship here so that a different effect is found when viewing in the transillumination mode than when viewing in the incident illumination mode. In addition it is also possible for reflective and transmissive regions of the optically variable elements 52 and 53 to be disposed in mutually superposed relationship so that the effect presented to the viewer from the front side and from the rear side respectively is afforded respectively by the alternate superimposition of transmissive and reflective regions of the optically variable elements 52 and 53.

It would also be possible to dispense with the security overprinting 54 and 56.

Figure 5B:
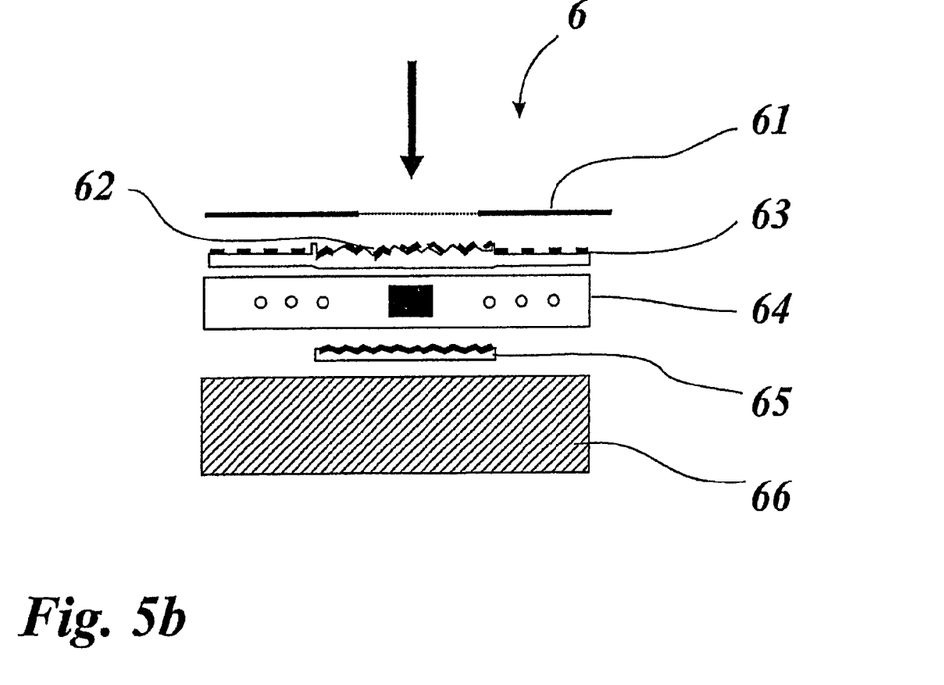

FIG. 5b shows a security element 6 which is viewed through a page 61 with an inspection window and which is applied to a substrate 66. Applied to a flexible film body 64 with integrated RF antenna and electronic circuit is the transfer layer of a transfer film which in the region of the electronic circuit has an optically variable element 62 surrounded by an optional security overprint 63. Applied to the opposite surface of the film body 64 is the transfer layer of a transfer film which includes an optically variable element 65. The optically variable element 62 is a partly transparent optically variable element. The optically variable element 65 is a reflective optically variable element, for example a thin film structure or a structure which has an optical-diffraction effect and is provided with a reflection layer. Accordingly for the viewer the electronic circuit appears in front of the background of the optical effects which are generated by the optically variable element 65 and which furthermore are additionally superimposed by the optical effects generated by the optically variable element 62.

Furthermore it is also possible for the security element not to be connected to a page of the security document for example by adhesive, but for the security element to form a flexible multi-layer film body which is shaped in the form of a page and which is introduced into the security document as a page thereof for example by stapling, binding or adhesive. As already described hereinbefore such a security element can be provided in region-wise manner with an overprint which leaves free only the region of an inspection window for checking the first and/or second optically variable elements.

Figure 6A:
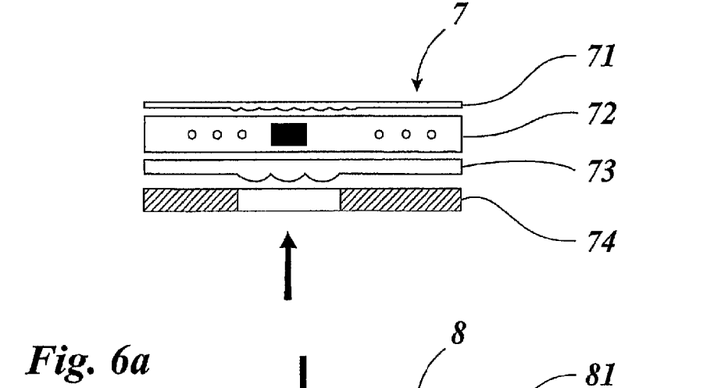
Figure 6B:
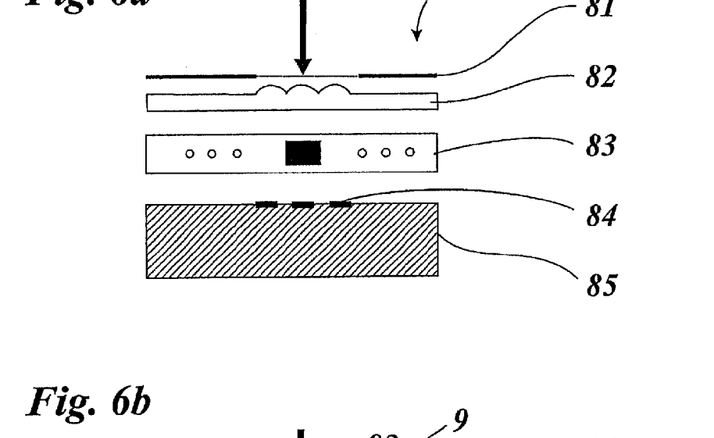
Figure 6C:
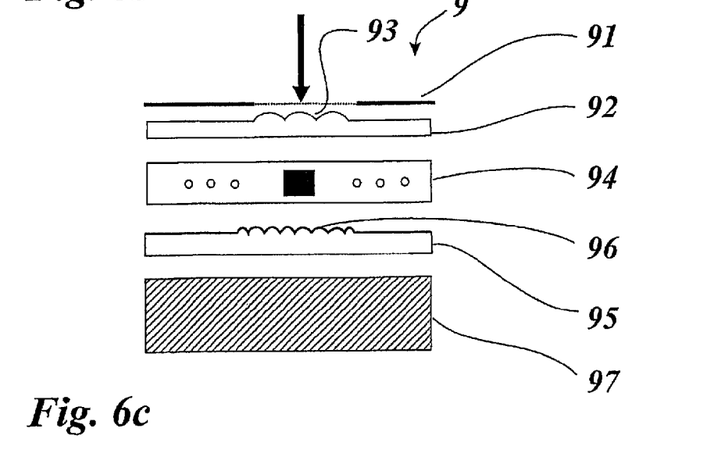

FIGS. 6a through 6c show security elements 7, 8 and 9 in which the region of the electronic circuit of a film body 72, 83 and 84 is superimposed on one side by a respective optically variable element which has a microlens raster.

A microlens raster of that kind preferably comprises a carrier layer in which a refractive macroscopic lens structure is shaped by means of a corresponding embossing tool. It is however also possible for the lens raster to be generated by means of an optical-diffraction relief structure which by optical-diffraction means generates the effect of a plurality of adjacently arranged convex lenses.

Such a microlens raster provides that a precisely defined region of the optically variable elements 71, 84 and 96 arranged on the other side of the flexible film bodies 72, 83 and 84 is enlarged and the superimposition thereof shown to the viewer. Thus it is possible for example to generate an enlarged representation of a repetitive pattern arranged on the opposite side, with suitable orientation of the line raster in relation to the repetitive structure.

In the embodiment shown in FIG. 6a the security element 7 is disposed on a substrate 74 which has an inspection window in the region of the microlens raster 73. Arranged on the opposite surface of the film body 72 is a reflective optically variable element 71 which has an optical-diffraction element. Now, according to the orientation of the optically variable element 71 relative to the lens raster 73, the viewer is presented with an otherwise concealed optical effect which results from the phase position of the regions of the optically variable element 71 in relation to the lens raster.

In the embodiment shown in FIG. 6b the lens raster 82 acts as a moiré analyser for a moire image 84 applied by printing to a substrate 85. With suitable orientation of the lens raster 82 in accurate register relationship with respect to the moiré pattern of the print 84 that arrangement presents an otherwise concealed moiré image.

In this respect a moiré pattern is a repeating, structure-forming pattern which, upon superimposition with or when viewed through a further repeating, structure-forming pattern which acts as a moiré analyser, presents a fresh pattern, more specifically the moiré image, which is concealed in the moiré pattern. In the simplest case that moiré effect arises out of the superimposition of dark and light strips, wherein regions in which the dark strips of the moiré pattern and the moiré analyser are disposed in mutually superposed relationship appear lighter than in regions in which the dark strips of the moiré pattern and the moiré analyser are disposed side-by-side. Besides a linear line raster it is also possible for the lines of the line raster to have curved regions and for them to be arranged for example in a wave-shaped or circular configuration. In this case also the moiré image can be encoded by suitable region-wise phase displacement of the curved line raster. Furthermore it is also possible to use a moiré pattern which is based on two line rasters which are rotated one within the other. Decoding of the moiré image in a line raster of that kind is also effected by a region-wise phase displacement of the line raster, in which case two different moiré images can be encoded in a moiré pattern of that kind. If thus the orientation of the moiré analyser with respect to the moiré image is changed, then a second image, for example a warning notice, can be seen instead of a first desired image.

FIG. 6c now shows the combination of the microlens raster 93 with a reflective microlens raster 96. A reflective microlens raster of that kind is produced by coating a microlens raster which is produced as illustrated hereinbefore with a reflective layer, for example a thin metal layer. Instead of a reflective microlens raster of that kind the optically variable element 95 can also have one or more concave mirror elements which are preferably oriented to a raster and which, as already set forth hereinbefore in relation to the lens raster, can be embodied in the form of macroscopic refractive or in the form of diffractive concave mirror elements. The superimposition of diffractive elements of that kind makes it possible to produce special optical effects which can be imitated by means of other technologies, only with a very great deal of difficulty.

Figure 7A:
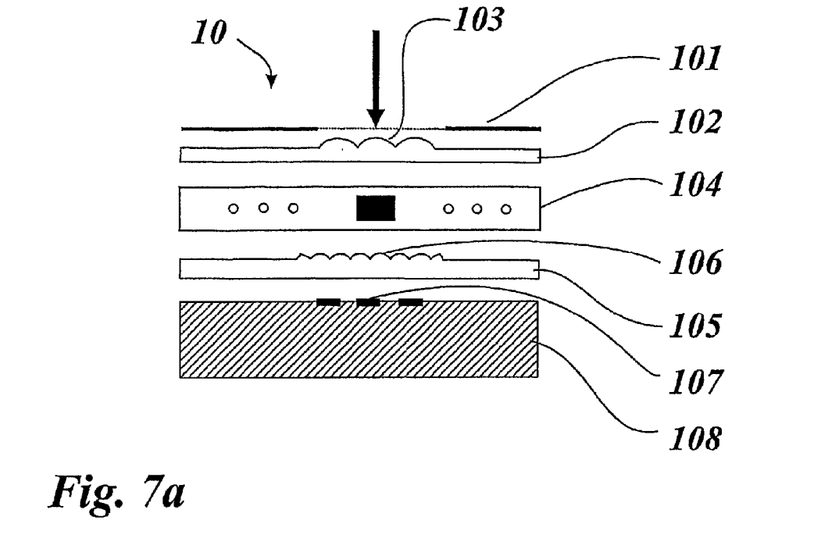

FIG. 7a shows a security element 10 which is applied to the surface of a substrate 108 of a security document and is covered over region-wise by a page 101 of that security document. An optically variable element 102 is permanently fixed on the one surface of a flexible film body 104 including the RF antenna and an electronic circuit while an optically variable element 105 is permanently fixed on the opposite surface, using one of the above-identified methods. As indicated in FIG. 7a both optically variable elements 102 and 105 have a transmissive macrolens raster 103 and 106 respectively. Before application of the security element 10 a security print 107 is applied by printing to the substrate 108, being provided in the region of the electronic circuit 104 of the security element. The viewing impression which is presented to the viewer when inspecting the security element 10 is thus determined by the representation of the security print 107, the orientation and focal length of the microlenses of the optically variable elements 103 and 105, the spacing of the optically variable elements 102 and 105, and the relative positioning of the optically variable elements 103 and 106 and the security print 107 relative to each other. If one of those components is altered, for example the spacing of the optically variable elements 102 and 105, the positioning of the optically variable elements 102 and 105 relative to each other or the position of those optically variable elements relative to the security print 107, that gives a different viewing impression when inspecting the security element 10. In addition it is also possible here, as already described with reference to FIG. 6b, to encode a concealed security feature in the security print 107 and in the positioning of the microlens rasters 103 and 106, which is produced only upon superimposed viewing and corresponding orientation of the microlens rasters 103 and 106 and the security print 107. Encoding in that case can be effected for example in the manner of a moiré image by virtue of a phase displacement based on a common line raster.

The particular advantage of this embodiment of the invention is that any manipulation of the large number of parameters which are relevant to the viewing impression can be very well detected and the diffractive optics formed by the optically variable elements 102 and 105 afford a striking optically variable effect which is to be imitated only with a very great deal of difficulty by means of other methods.

Figure 7B:
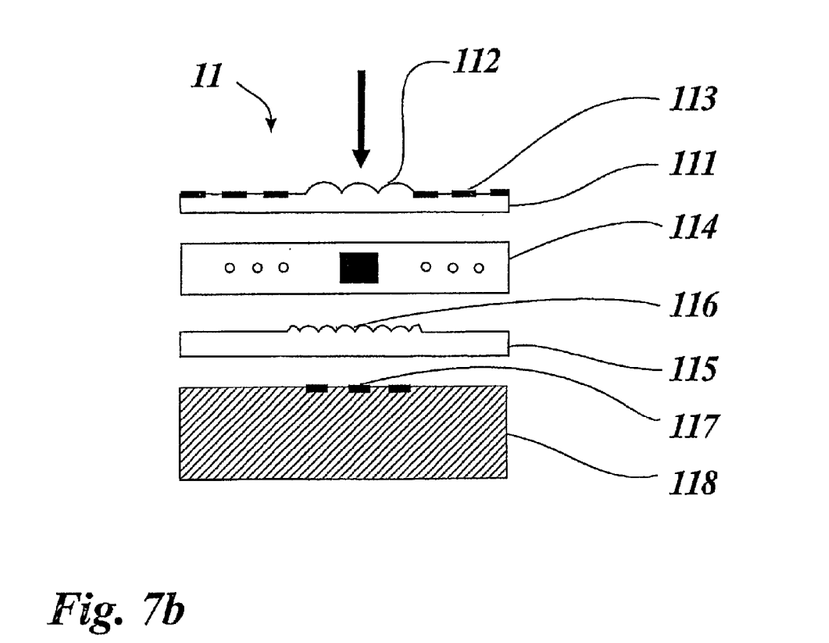

FIG. 7b shows an optical security element 11 which comprises a flexible film body 114 with an RF antenna and an electronic circuit as well as an optically variable element 111 applied to the one surface of the film body 114 and having a microlens raster 112 and an optically variable element 115 applied to the opposite surface of the film body 114 and having a microlens raster 116, The security element 11 is applied to a substrate 118 of a security document, which substrate is provided with a security print 117 thereon, and exhibits the effects already described with reference to FIG. 7a. In contrast to the embodiment of FIG. 7a however the security element 11 is not covered by a page of the security document with an inspection window arranged in the region of the electronic circuit, but is for its part provided with a security print 113 thereon, which leaves an inspection window open in the region of the microlens raster 112 and covers the region of the RF antenna of the film body 114.

What is claimed is:

1. A security element for RF identification, wherein the security element has a flexible film body into which are integrated an electronic circuit which is designed for the storage of security-relevant items of information and an RF antenna which is operatively connected to the electronic circuit and which serves for contact-less communication of the electronic circuit with a test device, wherein permanently fixed on at least a portion of a first surface of the flexible film body is a first optically variable element which at least region-wise covers the region of the flexible film body in which the electronic circuit is arranged, wherein permanently fixed on at least a portion of a second surface of the flexible film body is a second optically variable element, the first surface opposing the second surface, wherein the omission of or change to either of the first and second optically variable elements is recognizable from one side of the flexible film body, wherein at least one of the first and second optically variable element has a metallic reflection layer and the RF antenna is arranged outside the region in which the first or the second optically variable element respectively is provided and the RF antenna and the first or second optically variable element respectively thus do not overlap, wherein a) the optical effects generated by the first optically variable element and by the second optically variable element show mutually supplementary representations, or b) the first and second optically variable elements overlap at least in region-wise manner.

2. A security element as set forth in claim 1, wherein the electronic circuit adjoins the first surface of the flexible film body and the first optically variable element is directly permanently fixed at least in region-wise manner on the electronic circuit.

3. A security element as set forth in claim 1, wherein the flexible film body is transparent in the region surrounding the electronic circuit.

4. A security element as set forth in claim 1, wherein in case a) the first and second optically variable elements overlap at least in region-wise manner.

5. A security element as set forth in claim 4, wherein transmissive regions of the first optically variable element and reflective regions of the second optically variable element overlap.

6. A security element as set forth in claim 4, wherein a further concealed optical effect becomes visible by virtue of the superimposition of the first and second optically variable elements.

7. A security element as set forth in claim 1, wherein in case b) transmissive regions of the first optically variable element and reflective regions of the second optically variable element overlap.

8. A security element as set forth in claim 1, wherein in case b) a further concealed optical effect becomes visible by virtue of the superimposition of the first and second optically variable elements.

9. A security element as set forth in claim 8, wherein the first optically variable element comprises a moiré analyser and the second optically variable element comprises a moiré pattern.

10. A security element as set forth in claim 8, wherein the first optically variable element has a transmissive lens raster and the second optically variable element has a reflective, diffractive structure or an imprint.

11. A security element as set forth in claim 8, wherein the first optically variable element has a transmissive lens raster and the second optically variable element has a reflective lens raster.

12. A security element as set forth in claim 8, wherein the first optically variable element has a first transmissive lens raster and the second optically variable element has a second transmissive lens raster.

13. A security element as set forth in claim 1, wherein the first optically variable element has a partial reflection layer and a replication lacquer layer in which an optically-diffractively active relief structure is shaped.

14. A security element as set forth in claim 1, wherein the first optically variable element produces a transmissive optical-diffraction effect.

15. A security element as set forth in claim 1, wherein at least one of the first and the second optically variable element has one or more print layers preferably containing an effect pigment.

16. A security element as set forth in claim 1, wherein at least one of the first and the second optically variable element has one or more thin film layers for producing viewing angle-dependent color shifts by means of interference.

17. A security element as set forth in claim 1, wherein the RF antenna and the electronic circuit are operatively connected by a wave guide.

18. A security document, comprising:
a security element for RF identification, the security element including a flexible film body having an electronic circuit for the storage of security-relevant items of information, the electronic circuit integrated in the flexible film body, wherein an RF antenna is operatively connected to the electronic circuit providing contact-less communication of the electronic circuit with a test device, wherein permanently fixed on a portion of a first surface of the flexible film body is a first optically variable element which at least region-wise covers the region of the flexible film body in which the electronic circuit is arranged, wherein permanently fixed on a portion of a second surface of the flexible film body is a second optically variable element, the first surface opposing the second surface, wherein the omission of or change to either of the first and second optically variable elements is recognizable from one side of the flexible film body, wherein at least one of the first and second optically variable element has a metallic reflection layer and the RF antenna is arranged outside the region in which the first or the second optically variable element respectively is provided and the RF antenna and the first or second optically variable element respectively thus do not overlap, wherein:
a) the optical effects generated by the first optically variable element and by the second optically variable element show mutually supplementary representations, or
b) the first and second optically variable elements overlap at least in region-wise manner.

19. A security document as set forth in claim 18, wherein the security document has one or more pages which have an electrically conductive layer arranged in the region of the RF antenna of the security element for electromagnetic screening of the RF antenna.

20. A security document as set forth in claim 19, wherein one or more of the pages having an electrically conductive layer arranged in the region of the RF antenna of the security element are provided with a third optically variable element which presents a supplementary representation in relation to the first and/or second optically variable element and/or covers over the first or the second optically variable element at least in region-wise manner.

21. A security document as set forth in claim 18, wherein the security element is applied to the back page of the security document and a transparent inspection window is provided in the adjacent page of the security document in accurate register relationship with the first optically variable element.

22. A security document as set forth in claim 18, wherein the security element is introduced between two pages of the security document and is glued thereto, wherein a transparent inspection window is provided in the one and the other of said pages in accurate register relationship with the first or second optically variable element respectively.

23. A security document as set forth in claim 18, wherein the security element forms a flexible film body in the form of a page of the security document, which film body is sewn into the security document as a page thereof.

24. A security document as set forth in claim 18, wherein the security element is applied on a page of the security document and is overprinted in the region of the RF antenna with a print thereon.

25. A security document as set forth in claim 18, wherein at least one of the first and the second optically variable element overlap an individualised item of information applied on a page of the security document.

26. A security document as set forth in claim 18, wherein the RF antenna and the electronic circuit are operatively connected by a wave guide.

* * * * *